United States Patent [19]
Brokenshire et al.

[11] Patent Number: 4,896,210
[45] Date of Patent: Jan. 23, 1990

[54] STEREOSCOPIC GRAPHICS DISPLAY TERMINAL WITH IMAGE DATA PROCESSING

[76] Inventors: Daniel A. Brokenshire, 200 S. W. Greenridge Dr., Apt. 802, Lake Oswego, Oreg. 97035; Peter W. Hildebrandt, 3280 S. W. 170th, Apt. 1405, Beaverton, Oreg. 97006

[21] Appl. No.: 121,188

[22] Filed: Nov. 16, 1987

[51] Int. Cl.⁴ ............................................. H04N 13/00
[52] U.S. Cl. ........................................ 358/88; 340/755
[58] Field of Search .................. 340/716, 755; 358/88, 358/91, 92, 3; 350/130, 132

[56] References Cited

U.S. PATENT DOCUMENTS

| | | | |
|---|---|---|---|
| 4,647,966 | 3/1987 | Phillips et al. | 358/88 |
| 4,692,878 | 9/1987 | Ciongoli | 340/755 |
| 4,717,949 | 1/1988 | Eichenlaub | 340/716 |
| 4,719,507 | 1/1988 | Bos | 358/88 |
| 4,734,756 | 3/1988 | Butterfield et al. | 358/88 |
| 4,740,836 | 4/1988 | Craig | 358/88 |

Primary Examiner—Gerald Brigance
Assistant Examiner—Richard Hjerpe
Attorney, Agent, or Firm—Paul S. Angello; Mark M. Meininger; Robert S. Hulse

[57] ABSTRACT

A stereoscopic graphics display terminal (10) having an image data processor (22) generates stereoscopic image data from three-dimensional image data. In a preferred embodiment, the graphics display terminal receives from a main or host computer (12) three-dimensional image data corresponding to a three-dimensional representation of an object. The three-dimensional image data are typically generated by an application program that resides in the host computer. The image data processor includes an image orienting system (74) that receives the three-dimensional image data and adapts such data to represent a preselected orientation of the object and thereby provide an observer with a preselected view of the object. The adaptation of the three-dimensional image data by the image orienting system entails image manipulations that include rotating, translating, and scaling the size of the image. A data transformation system (78) receives the adapted three-dimensional image data and transforms such data into stereoscopic image data, which represent right- and left-eye views of the image. The right- and left-eye views are displayed by a display system (34) to present the stereoscopic representation of the image to an observer.

17 Claims, 3 Drawing Sheets

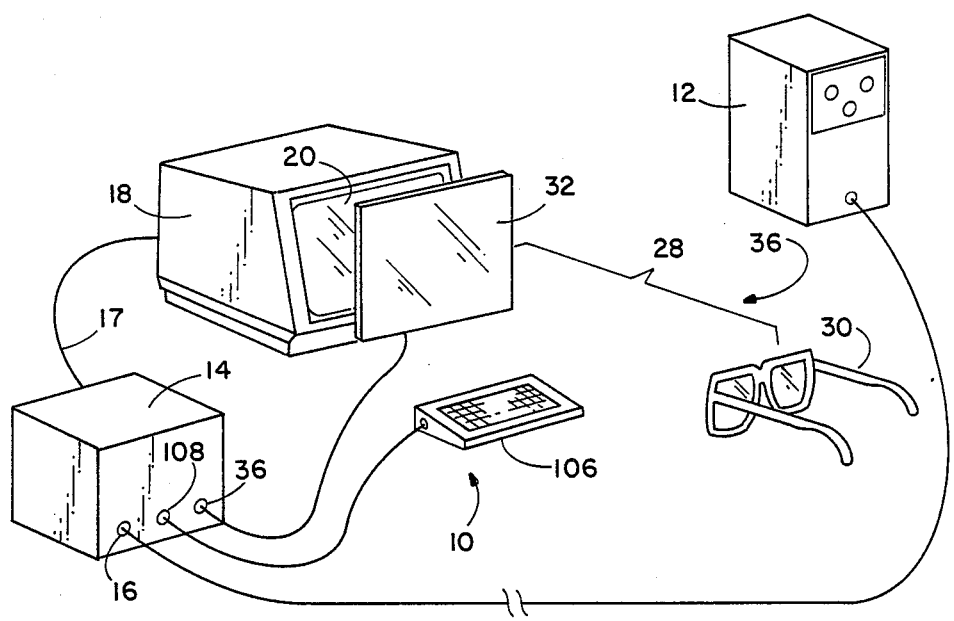
FIG. 1
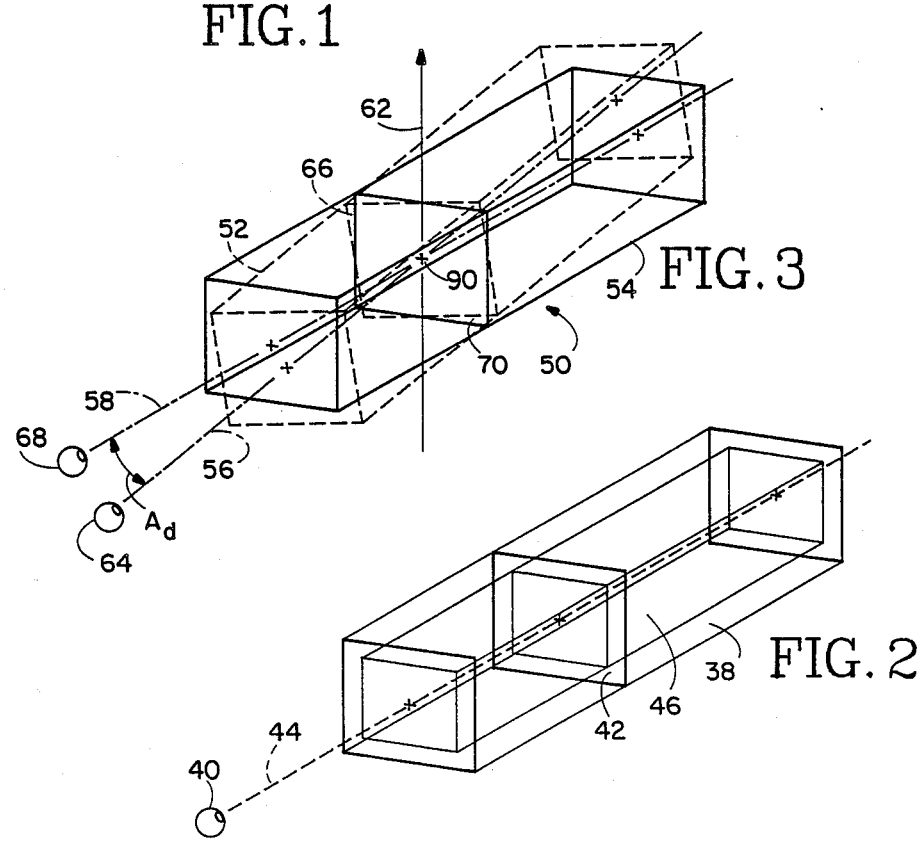
FIG. 3
FIG. 2

STEREOSCOPIC GRAPHICS DISPLAY TERMINAL WITH IMAGE DATA PROCESSING

TECHNICAL FIELD

The present invention relates to stereoscopic graphics display systems and, in particular, to a stereoscopic graphics display terminal having an image data processor that receives three-dimensional image data corresponding to a three-dimensional representation of an object and generates stereoscopic image data corresponding to a stereoscopic representation of the object to form on a display screen a stereoscopic image of the object.

BACKGROUND OF THE INVENTION

Stereoscopic graphics display terminals receive from a main or host computer image data that represent a physical object. The image data are generated by an application program such as, for example, a mechanical engineering computer-aided design program, which operates within the host computer. Typically, the application program generates three-dimensional image data corresponding to a three-dimensional representation of the object. Whenever they are rendered on a conventional two-dimensional display screen, the three-dimensional image data provide a single view of the object with perspective, hidden-line removal, shading, or other cues to assist an observer in visualizing the three-dimensional properties of the object.

Stereoscopic graphics display terminals require, however, stereoscopic image data that correspond to a stereoscopic representation of the object. The stereoscopic representation of the object comprises a right-eye view of the object and a left-eye view of the object. The right- and left-eye views are rendered on a two-dimensional display screen as a stereoscopic image and are directed toward an observer's right and left eyes, respectively. Since they represent only a single view of the object, the three-dimensional image data generated by the application program are incompatible with the operation of the stereoscopic display terminal.

One way to achieve compatibility between the three-dimensional image data and the stereoscopic display terminal is to configure the application program so that it generates stereoscopic image data from the three-dimensional image data. Such a configuration suffers, however, from at least three operational disadvantages.

First, generating stereoscopic image data by means of the application program consumes a relatively large portion of the valuable computing and data storage resources of the host computer. In particular, the stereoscopic image data corresponding to the right- and left-eye views of the object are formed by two complete sets of calculations and occupy about twice as much memory as does the three-dimensional image data.

Second, the host computer is typically operated in a multi-tasking format, thereby giving many users access to the host computer. As a consequence, the generation of the stereoscopic image data can be interrupted whenever an application having higher priority is run on the computer. In addition to delaying the formation of the overall stereoscopic image, such interruptions can also delay the rendering of portions of the right- and left-eye views, thereby causing the observer to experience "stereoscopic deprivation" and the eye strain resulting from it.

Third, image data are typically transmitted from the host computer to the display terminal in a serial format. The transmission of stereoscopic image data from the host computer to the display terminal would require a transmission period that is twice as long as that for three-dimensional image data. In the case of complicated objects, the duration of the transmission period for stereoscopic image data could be so long that it would interfere with the timing of the display of the right- and left-eye views of the object, thereby also causing the observer to experience stereoscopic deprivation.

SUMMARY OF THE INVENTION

An object of this invention is, therefore, to provide a stereoscopic graphics display terminal that forms a stereoscopic image from three-dimensional image data.

Another object of this invention is to provide such a graphics display terminal that employs relatively few computing and data storage resources of a host computer in the generation of stereoscopic image data.

A further object of this invention is to provide such a graphics display terminal in which image data are transmitted to the terminal in a relatively short period of time.

Still another object of this invention is to provide such a graphics display terminal that reduces the stereoscopic deprivation experienced by an observer.

Yet another object of this invention is to provide such a graphics display terminal that is compatible with an application program that generates three-dimensional image data.

The present invention is a stereoscopic graphics display terminal having an image data processor. In a preferred embodiment, the graphics display terminal receives from a main or host computer three-dimensional image data corresponding to a three-dimensional representation of an object. The three-dimensional image data are typically generated by an application program that resides in the host computer.

The image data processor includes an image-orienting system and a data transformation system. The image-orienting system receives the three-dimensional image data and adapts such data to represent a preselected orientation, and thereby provide an observer with a corresponding view, of the object. The adaptation of the three-dimensional image data entails image manipulations that include rotating, translating, and scaling the size of the image of the object. The data transformation system receives the adapted three-dimensional image data and transforms such data into stereoscopic image data, which represent right- and left-eye views of the object. The right- and left-eye views are displayed by the stereoscopic graphics display terminal to present to an observer a stereoscopic image of the object.

The transmission of three-dimensional image data from the host computer to the display terminal takes place over a relatively short period of time. Since the image data processor generates stereoscopic image data from three-dimensional image data, the display terminal consumes relatively few computing and data storage resources of the host computer in the generation of stereoscopic image data. Moreover, the relatively fast transmission of image data from the host computer and the independent generation of stereoscopic image data reduce the amount of stereoscopic deprivation experienced by an observer of the display terminal.

Additional objects and advantages of the present invention will be apparent from the following detailed description of a preferred embodiment thereof, which proceeds with reference to the accompanying drawings.

BRIEF DESCRIPTION OF THE DRAWINGS

FIG. 1 is a diagram of a stereoscopic graphics display terminal of the present invention.

FIG. 2 is a schematic representation of a monocular viewing model representing the three-dimensional space within which three-dimensional image data are defined.

FIG. 3 is a schematic representation of a binocular viewing model representing the pair of three-dimensional spaces within which stereoscopic image data are defined.

DETAILED DESCRIPTION OF PREFERRED EMBODIMENT

Figure 4:
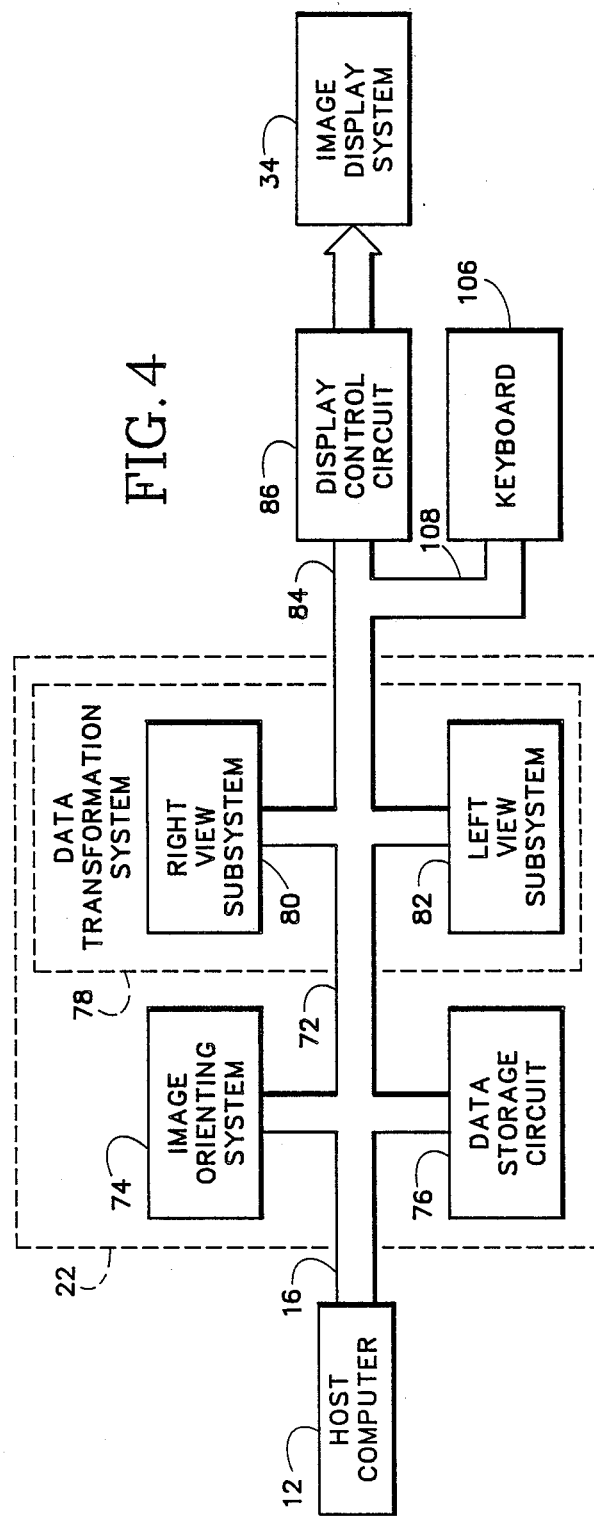
FIG. 4 is a simplified block diagram of an image data processor employed in the terminal of FIG. 1.

FIG. 1 is a diagrammatic representation of a stereoscopic graphics display terminal 10 in direct electrical communication with a main or host computer 12. Display terminal 10 includes a terminal controller unit 14 that receives image data delivered through a communication means or port 16 from host computer 12. The image data are generated, for example, by a mechanical engineering computer-aided design program. Terminal controller unit 14 provides on a display data link 17 control signals that direct a cathode-ray tube 18 to form on its display screen 20 graphics display images corresponding to the image data.

Terminal controller unit 14 receives from host computer 12 three-dimensional image data that correspond to a three-dimensional representation of a physical object. The three-dimensional image data are characterized as monocular viewing parameters for rendering on a two-dimensional display screen an image representing a one-eyed, three-dimensional view of the object. The image includes perspective, hidden-line removal, shading, or other cues to assist an observer in visualizing the three-dimensional properties of the object.

Terminal controller unit 14 includes an image data processing means or processor 22 (FIG. 4) that converts the three-dimensional image data into stereoscopic image data. The stereoscopic image data correspond to right- and left-eye perspective views of the object, which views are formed on display screen 20 and are directed by a stereoscopic switch unit 28 toward an observer's right and left eyes, respectively. The right- and left-eye views comprise a stereoscopic image of the object, which image allows the observer to perceive the three-dimensional properties of the object.

Copending Bos U.S. patent application Ser. No. 727,401, entitled Stereoscopic Imaging System With Passive Viewing Apparatus, filed Apr. 26, 1985, describes the operation of stereoscopic switch unit 28, which includes a set of polarized eyeglasses 30 and a liquid crystal encoder module 32 that receives control signals from an output 36 of terminal controller unit 14. Encoder 32 separately encodes alternate light images on display screen 20 of cathode-ray tube 18 in right- and left-circularly polarized light. The alternate light images correspond to the right- and left-eye views of the object. Polarized eye glasses 30 include right and left lenses which transmit, respectively, the right- and left-circularly polarized light, thereby transmitting the right-eye view of the object to the observer's right eye and the left-eye view of the object to the observer's left eye. Cathode-ray tube 18, liquid crystal encoder module 32, and eyeglasses 30 comprise a display means or system 36.

FIGS. 2 and 3 are schematic representations of monocular and binocular viewing models, respectively, from which the display images are derived. The monocular viewing model represents the single three-dimensional space an object occupies as perceived by an observer using one eye. The binocular viewing model represents the two three-dimensional spaces an object occupies as perceived by an observer using both eyes.

In particular, FIG. 2 shows an image modeling space 38 corresponding to the single three-dimensional space in which a monocular, three-dimensional representation of an object is depicted. One of an observer's eyes 40 observes a two-dimensional view plane 42 along a line-of-sight 44. View plane 42 typically corresponds to the display screen 20, upon which the three-dimensional representation of the object is formed with perspective, hidden-line removal, shading, or other visual cues to indicate depth. The portion or subset of image modeling space 38 that is actually employed in rendering an image of the object is called a viewing volume 46. Three-dimensional image data generated by an application program that resides in host computer 12 are typically defined by a set of coordinates corresponding to image modeling space 38.

FIG. 3 shows a stereoscopic viewing space 50 corresponding to the two three-dimensional spaces in which a stereoscopic representation of an object is depicted. Stereoscopic viewing space 50 comprises three-dimensional right- and left-eye viewing spaces 52 and 54, respectively. Viewing spaces 52 and 54 are aligned with respective lines-of-sight 56 and 58, which are separated by a binocular disparity angle $A_d$. The disparity angle $A_d$ corresponds to a rotational displacement about a vertical axis 62 of viewing space 52 relative to viewing space 54. Preferably, viewing spaces 52 and 54 are rotated in opposite directions about axis 62 by an amount $|A_d/2|$ to form the disparity angle $A_d$.

An observer's right eye 64 views a two-dimensional right-eye view plane 66 in which a three-dimensional representation of a right-eye view of the object is formed with perspective, hidden-line removal, shading, or other visual cues to depict depth. Similarly, the observer's left eye 68 views a two-dimensional left-eye view plane 70 in which a similar three-dimensional representation of a left-eye view of the object is formed. View planes 66 and 70 typically correspond to the display screen 20 upon which the right- and left-eye views of the object are alternately formed. Differences between the right- and left-eye views of the object correspond to binocular disparity that allows the observer to perceive depth in the stereoscopic image of the object.

FIG. 4 is a block diagram of image data processor 22 of terminal controller unit 14. Image data processor 22 communicates with host computer 12 through communication port 16. Host computer 12 provides to image data processor 22 three-dimensional image data that are defined by a set of modeling space coordinates corresponding to image modeling space 38 (FIG. 2). The three-dimensional image data are directed along a data transfer bus 72 to an image orienting means or system 74 which transforms the three-dimensional modeling space coordinates of host computer 12 into three-dimensional viewing space coordinates.

The transformation of the modeling space coordinates into viewing space coordinates corresponds to orienting the object to provide an observer with a preselected view of the object. This transformation produces image manipulations that include rotating and translating the image of the object as well as scaling the size of the viewing volume.

An optional data storage means or circuit 76 communicates with image orienting system 74 over data bus 72 and stores the three-dimensional image data. In particular, data storage circuit 76 receives both the modeling space coordinates and the viewing space coordinates of an object. By storing the modeling space coordinates in data storage circuit 76, different views of the object can be generated without having to recall the modeling space coordinates from host computer 12, thereby reducing the computational and data storage resources of computer 12 that are used in the generation of different views of the object. By storing the viewing space coordinates, data storage circuit 76 provides an output memory buffer for the image data generated by image orienting system 74.

Image orienting system 74 performs matrix multiplication in the transformation of the modeling space coordinates into viewing space coordinates. In particular, an image orienting transformation matrix [To] is multiplied by the modeling space coordinates to generate the viewing space coordinates. The image orienting transformation matrix [To] is described by Foley et al. in *Fundamentals of Interactive Computer Graphics*, Addison-Wesley Publishing Co. (1982), and is defined as the matrix product of a set of image manipulating matrices [T], [R], and [Trl] and can be expressed as:

$$[To] = [T] \times [R] \times [Trl],$$

where
- [T] translates the zero or reference point of the image modeling space to the zero or reference point of the image viewing space;
- [R] rotates the coordinate system axes of the image modeling space onto the coordinate system axes of the image viewing space; and
- [Trl] converts the image modeling space coordinate system from a left-handed system to a right-handed system, thereby converting the image data from the convention employed in describing three-dimensional objects to the convention employed in rendering images of such objects.

The product of the image orienting transformation matrix [To] and the modeling space coordinates provides the three-dimensional viewing space coordinates that correspond to the preselected view of the object. The viewing space coordinates are stored in data storage circuit 76 and are directed over data bus 72 to a data transformation means or system 78.

Data transformation system 78 receives the viewing space coordinates corresponding to the oriented object and transforms them into a set of stereoscopic imaging coordinates that represent right- and left-eye views of the object. Preferably, data transformation system 78 includes a right view subsystem 80 and a left view subsystem 82 that generate the stereoscopic imaging coordinates representing the respective right- and left-eye views of the object. The stereoscopic imaging coordinates are provided to an input 84 of a display control circuit 86, which generates signals for controlling image display system 36. In particular, control signals for cathode-ray tube 18 and encoder module 32 are simultaneously provided to data transfer bus 17 and output 36 of terminal controller unit 14 (FIG. 1), respectively, for alternately displaying the right- and left-eye views of the object. An observer wearing eyeglasses 30 is thereby provided with a stereoscopic image representing the object Data transformation system 82 transforms the three-dimensional viewing space coordinates into stereoscopic imaging coordinates through matrix multiplication. In particular, stereoscopic imaging transformation matrices [Tr] and [Tl] are multiplied by the viewing space coordinates to provide the stereoscopic imaging coordinates corresponding to the respective right- and left-eye views. Each of the stereoscopic imaging transformation matrices [Tr] and [Tl] is also described by Foley et al. and is defined as the matrix product of a set of image manipulating matrices:

$$[Tr] = [T + dc] \times [Rr] \times [T - dc] \times [Shz] \times [S] \text{ and}$$

$$[Tl] = [T + dc] \times [Rl] \times [T - dc] \times [Shz] \times [S]$$

where
- [T+dc] translates a disparity center 90 (FIG. 3), which is defined as the intersection of the right and left lines-of-sight 56 and 58, respectively, from an original position to the zero or reference point of the image viewing space;
- [Rr] horizontally rotates the coordinate axes of the image viewing space in a counter-clockwise direction about disparity center 90 by an amount equal to one-half of the disparity angle $A_d$;
- [Rl] horizontally rotates the coordinate axes of the image viewing space in a clockwise direction about disparity center 90 by an amount equal to one-half of the disparity angle $A_d$;
- [T−dc] translates disparity center 90 back to its original position, disparity center 90 having been positioned at the reference point of the image viewing space to facilitate the formation of the right- and left-eye views;
- [Shz] shears the viewing space along the depth axis to form a preselected viewing volume; and
- [S] scales the viewing volume to form the perspective canonical view volume.

The products of the stereoscopic imaging transformation matrices [Tr] and [Tl] and the viewing space coordinates provide the stereoscopic imaging coordinates corresponding to the respective right- and left-eye views of the object. The stereoscopic imaging coordinates are applied to input 84 of display control circuit 86, which generates the control signals by which image display system 34 forms the stereoscopic image of the object.

It will be appreciated that the image orienting transformation matrix [To] can be incorporated into the stereoscopic imaging transformation matrices [Tr] and [Tl] to form a pair of general transformation matrices [TR] and [TL], respectively, which directly transform the modeling space coordinates into stereoscopic imaging coordinates. Each of the general transformation matrices [TR] and [TL] would, therefore, be defined as the matrix product of image manipulating matrices:

$$[TR]=[T]\times[R]\times[Trl]\times[T+dc]\times[Rr]\times[T-dc]\times[Shz]\times[S] \text{ and}$$

$$[TL]=[T]\times[R]\times[Trl]\times[T+dc]\times[Rl]\times[T-dc]\times[Shz]\times[S]$$

where each of the image manipulating matrices is defined above.

Figure 5:
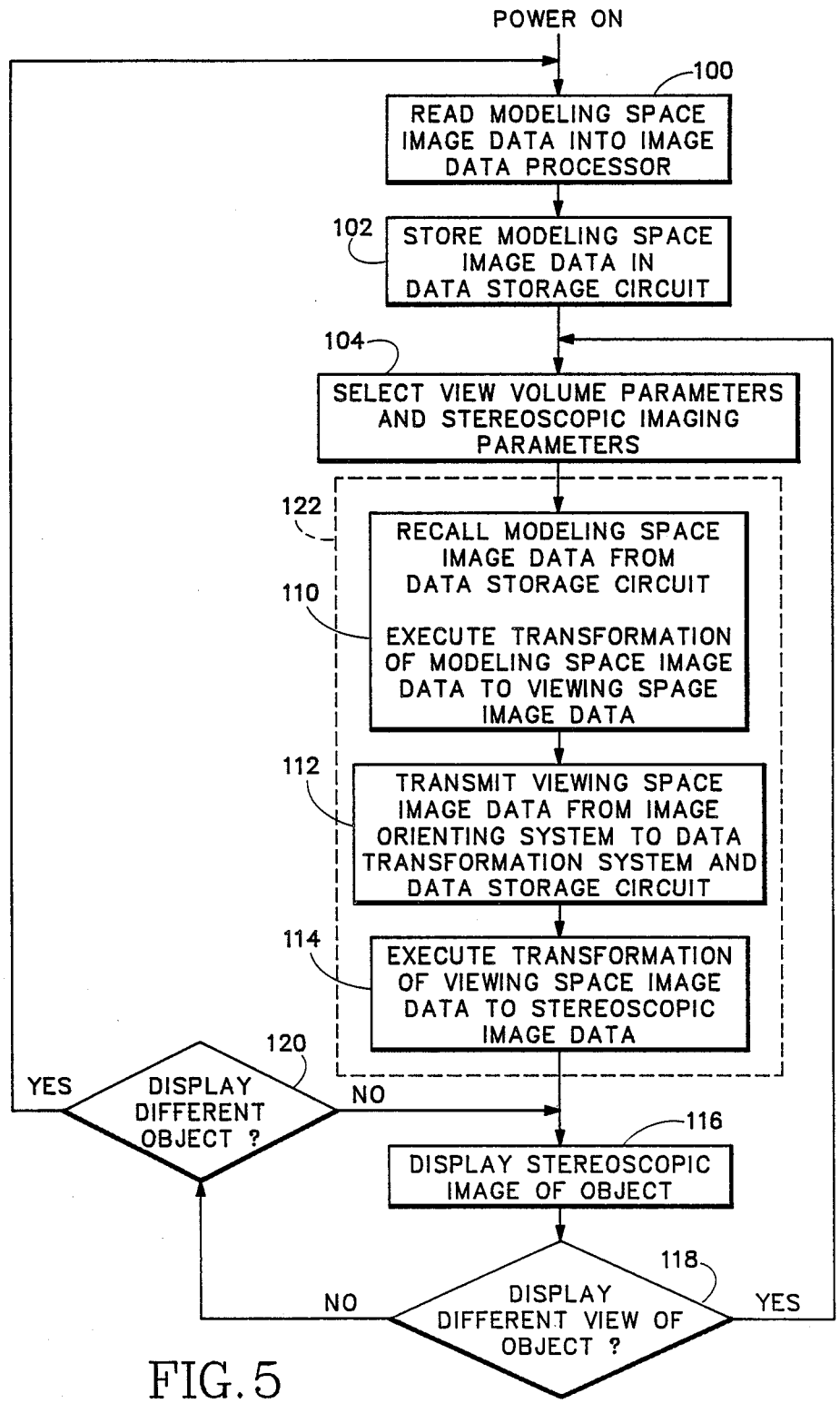
FIG. 5 is a flow diagram showing the operation of the image data processor of FIG. 4.

FIG. 5 is a flow diagram of the processing steps employed in image data processor 22. With reference to FIGS. 4 and 5, after power is applied to processor 22, the first step 100 is the transfer of modeling space image data from host computer 12 to image data processor 22. Step 102 entails loading the modeling space image data into data storage circuit 76.

Step 104 entails selecting both a particular view of the object and a particular stereoscopic representation of the object An observer using display terminal 10 typically selects the view and the stereoscopic representation by entering view volume parameters and stereoscopic imaging parameters, respectively, into terminal controller unit 14. The view volume parameters represent image manipulations such as rotating and translating the image of the object, scaling the size of the view volume, clipping the depth of the view volume, zoom, pan, and oblique views of the object. The stereoscopic imaging parameters include the disparity angle $A_d$ and the disparity center 90 about which the view volume is rotated by an amount $A_d/2$ in a clockwise direction for the left-eye view and by an amount $A_d/2$ in a counterclockwise direction for the right-eye view. The stereoscopic imaging parameters can, alternatively, be modeled as the separation between the observer's eyes and the focal distance between the observer and the disparity center 90, thereby determining the magnitude of the disparity angle $A_d$. These different stereoscopic imaging parameters are interrelated by relatively simple trigonometric relationships.

The view volume parameters and the stereoscopic imaging parameters are entered into terminal controller unit 14 through a data input means such as, for example, a keyboard 106 (FIG. 1) that is electrically connected to terminal controller unit 14. The view volume parameters and the stereoscopic imaging parameters can also be entered into terminal controller unit 14 from a data file stored within host computer 12, an application program that resides in host computer 1 2, or a local data storage device such as a disk drive.

The view volume parameters are applied through a data link 108 to data bus 72, which transfers the view volume parameters to image orienting system 74. Orienting system 74 generates the image orienting transformation matrix [To] that corresponds to the view volume parameters entered by the observer. Similarly, the stereoscopic imaging parameters are transmitted over data bus 72 to data transformation system 78, which generates the stereoscopic imaging transformation matrices [Tr] and [Tl] that correspond to the stereoscopic imaging parameters entered by the observer. Whenever the observer does not enter view volume parameters or stereoscopic imaging parameters, terminal controller unit 14 sets predetermined default values.

Step 110 indicates that the modeling space image data are recalled from data storage circuit 76 by image orienting system 74, which transforms the modeling space image data to viewing space image data by multiplication of the modeling space image data by the image orienting transformation matrix [To].

Step 112 indicates that the viewing space image data generated by image orienting system 74 are transmitted over data bus 72 to data storage circuit 76 and data transformation system 82.

Step 114 indicates that the viewing space image data are transformed into stereoscopic imaging data by multiplication of the viewing space image data by the stereoscopic imaging transformation matrices [Tr] and [Tl].

Step 116 entails the transmission to display control circuit 86 of the stereoscopic imaging data generated by data transformation system 78. Display control circuit 86 generates control signals that direct image display system 34 to provide to an observer the stereoscopic image of the object.

Step 118 is a check to determine whether the observer wishes to observe a different view of the object. Whenever the observer wishes to observe a different view of the object, step 118 returns the processing cycle to step 104, thereby allowing the observer to select the new view volume parameters and stereoscopic imaging parameters. Whenever the observer does not wish to observe a different view of the same object, step 118 allows the processing cycle to continue to step 120.

Step 120 is a check to determine whether the observer wishes to observe a different object. Whenever the observer wishes to observe a different object, step 120 returns the processing cycle to step 100, thereby to prepare image data processor 22 to receive a new set of modeling space image data. Whenever the observer does not wish to observe a different object, step 120 returns the processing cycle to step 116 to continue the display of the present object.

Step 122 (shown in phantom) represents a processing step that occurs between steps 104 and 116 Whenever the image orienting transformation matrix [To] is incorporated into the stereoscopic imaging transformation matrices [Tr] and [Tl] to form the respective general transformation matrices [TR] and [TL]. In particular, step 122 indicates that the modeling space image data are recalled from data storage circuit 76 and are transformed directly to stereoscopic image data by the general transformation matrices [TR] and [TL].

It will be obvious to those having skill in the art that many changes may be made to the details of the above-described preferred embodiment of the present invention without departing from the underlying principles thereof. For example, stereoscopic graphics display terminal 10 could receive three-dimensional image data from an information source other than a host computer, such as a disk drive that is a part of the terminal. The scope of the present invention should be determined, therefore, only by the following claims.

We claim:

1. A stereoscopic graphics display terminal for processing three-dimensional image data representative of a three-dimensional object and displaying a stereoscopic image of the object, comprising:

processor means coupled to receive three-dimensional image data as modeling space coordinates from an information source for transforming the modeling space coordinates into viewing space coordinates, and for transforming viewing space coordinates into stereoscopic image data, the modeling space coordinates representing a three-dimensional image of a three-dimensional object, the viewing space coordinates representing a preselected view of the object, and the stereoscopic image data representing a right-eye view and a left-eye view of the preselected view of the object; and display means coupled to the processor means and responsive to the stereoscopic image data for displaying the right- and left-eye views of the object, presenting to an observer a stereoscopic image of the object; wherein said processor means and said display means are resident in said stereoscopic graphics display terminal.

2. The terminal of claim 1 where the information source is a computer.

3. The terminal of claim 1 in which the display means comprises:

a cathode-ray tube that forms images of the right- and left-eye views of the object, an encoder module that encodes the images of the right- and left-eye views in respective first and second polarization senses, and polarized eyeglasses that transmit to an observer's right and left eyes light in the first and second polarization senses, respectively.

4. The terminal of claim 1 in which the processor means transforms the modeling space coordinates into viewing space coordinates by image manipulation, including selected operations of image rotation, translation, and scaling.

5. The terminal of claim 1 in which the processor means includes data storage means for receiving and storing the modeling space coordinates received from the information source.

6. The terminal of claim 1 in which the processor means includes image orientating means for transforming the modeling space coordinates into viewing space coordinates and data transformation means for transforming the viewing space coordinates into stereoscopic image data.

7. In a stereoscopic graphics display terminal having a resident processor and a display system that displays right- and left-eye views represented by stereoscopic image data, a method of generating the stereoscopic image data, comprising the steps of:

receiving from an information source modeling space coordinates representing a three-dimensional image of a three-dimensional object;

transforming the modeling space coordinates into viewing space coordinates representing a preselected view of the object; and transforming the viewing space coordinates into stereoscopic image data representing a right-eye view and a left-eye view of the preselected view of the object.

8. The method of claim 7 where the information source is a computer.

9. The method of claim 7 in which the modeling space coordinates are transformed into viewing space coordinates by image manipulation, including selected operations of image rotation, translation, and scaling.

10. In a stereoscopic graphics display terminal having a resident processor and a display system that displays right- and left-eye views represented by stereoscopic image data, an image data processor comprising:

image orienting means coupled to receive from an information source modeling space coordinates representing a three-dimensional image of a three-dimensional object for transforming the modeling space coordinates into viewing space coordinates representing a preselected view of the object; and data transformation means for transforming the viewing space coordinates into stereoscopic image data representing a right-eye view and a left-eye view of the preselected view of the object.

11. The image data processor of claim 10 where the information source is a computer.

12. The processor of claim 10 in which the image orienting means transforms the modeling space coordinates into viewing space coordinates by image manipulation, including selected operations of image rotation, translation, and scaling.

13. In a stereoscopic graphics display terminal having a resident processor and a display system for displaying right- and left-eye views of a stereoscopic image, a method of reducing delay in displaying one view subsequent to the other view sufficiently to avoid stereoscopic deprivation in viewing the image, comprising the steps of:

receiving from an information source modeling space coordinates representing a three-dimensional image of a three-dimensional object;

transforming the modeling space coordinates into viewing space coordinates representing a preselected view of the object;

transforming the viewing space coordinates into stereoscopic image data representing a right-eye view and a left-eye view of the preselected view of the object; and displaying the right- and left-eye views represented by the stereoscopic image data.

14. The method of claim 13 where the information source is a computer.

15. The method of claim 13 in which the displaying of the right- and left-eye view comprises:

forming on a display screen of a cathode-ray tube images of the right- and left-eye views of the object, encoding the images of the right- and left-eye views in respective first and second polarization senses, and transmitting to the observer's right and left eyes light in the first and second polarization senses, respectively.

16. The method of claim 13 in which the modeling space coordinates are transformed into viewing space coordinates by image manipulation, including selected operations of image rotation, translation, and scaling.

17. The method of claim 13 further comprising the step of storing the modeling space coordinates.

* * * * *